US008967791B2

(12) United States Patent
Ghanem et al.

(10) Patent No.: US 8,967,791 B2
(45) Date of Patent: Mar. 3, 2015

(54) METHOD OF PRINTING BLINDS WITH A FIXED BED INKJET PRINTER

(75) Inventors: Helen L. Ghanem, Raleigh, NC (US); Gabriel Ghanem, Raleigh, NC (US)

(73) Assignee: DreamScenes Blinds, LLC, Raleigh, NC (US)

( * ) Notice: Subject to any disclaimer, the term of this patent is extended or adjusted under 35 U.S.C. 154(b) by 349 days.

(21) Appl. No.: 13/462,136

(22) Filed: May 2, 2012

(65) Prior Publication Data

US 2013/0293626 A1 Nov. 7, 2013

(51) Int. Cl.
*C09D 11/00* (2014.01)
*B41J 3/407* (2006.01)

(52) U.S. Cl.
CPC .................................... *B41J 3/407* (2013.01)
USPC ............................................ 347/104; 347/20

(58) Field of Classification Search
CPC ...................................................... B41J 3/407
USPC ................................................... 347/104, 20
See application file for complete search history.

(56) References Cited

U.S. PATENT DOCUMENTS

| | | | | |
|---|---|---|---|---|
| 2,187,121 | A * | 1/1940 | Graves | 160/236 |
| 7,401,556 | B2 | 7/2008 | McCarty et al. | |
| 2005/0056382 | A1 * | 3/2005 | Khajavi | 160/167 R |
| 2005/0150409 | A1 * | 7/2005 | McCarty et al. | 101/479 |
| 2009/0130395 | A1 * | 5/2009 | Lyon et al. | 428/195.1 |

FOREIGN PATENT DOCUMENTS

| | | |
|---|---|---|
| FR | 2594071 A1 | 2/1986 |

* cited by examiner

*Primary Examiner* — Laura Martin
(74) *Attorney, Agent, or Firm* — James G. Passe; Passe Intellectual Property, LLC

(57) ABSTRACT

A method of producing a set of blinds with a custom printed graphic image disclosed. The set of blinds have slats which are not connected and thus the set of blinds can be assembled easily after having been printed on.

7 Claims, 5 Drawing Sheets

METHOD OF PRINTING BLINDS WITH A FIXED BED INKJET PRINTER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a method of digital printing on blinds. More particularly, the present method relates to a method for printing a digital image on the slats of horizontal blinds.

2. Description of Related Art

The use of window blinds has long been used to control both the aesthetics and light control for home and commercial window situations. Window blinds of the horizontal type include a plurality of opaque slats that are aligned horizontally with each other and have a device for raising and lowering the slats along with a means for adjusting the angle of each one of the slats by rotation around a horizontal axis of each of the slats. The most common window blinds are slat blinds, which consist of many horizontal slats, usually of metal, wood, or plastic connected together with string in a way that they can be rotated simultaneously to allow light to pass between the slats. The slats can be rotated up to about 170 degrees to hide the light, or pulled up, vertically, so that the entire window is clear. The most common method to connect slats together is to drill holes in each of the slats on opposite sides and run a string through each of the slats. More recently, horizontal blinds with no holes and with the slats resting on string loops have become available wherein the slats are held in place by gravity resting on the bottom of the loop. The slats are not connected to one another in any way. The slats can easily be removed by sliding them horizontally and the blinds can usually be rotated 180 degrees allowing either side of the slats to be viewed while remaining closed.

It has long been known that the interior side of horizontal window blinds can be decorated with colors or images that match or blend in with the decor of the room they are used in. They also have been decorated with messages and the like. The visibility of the image or message is controlled by the angle of the horizontal slats.

The idea of ink jet printing on blinds to produce an image on the blind slats has been explored in U.S. Pat. No. 7,401,556 issued Jul. 22, 2008 to McCarty et al. and having a priority of Jan. 9, 2004 which provides that horizontal blind slats each having a pair of holes are mounted on a fixture assembly that support each slat and are attached to a table which is moved into an inkjet printer (with no fixed bed print table) instead of the regular fixed bed utilized in many large format inject printers. The problem of course is the expense of a separate support fixture for the slats, the need to in most cases attach the slats to the fixture, and the labor to disconnect and reconnect each of the slats onto strings (i.e. restring them) or other normal blind setups makes the method not very commercially attractive. In addition, the standard blinds that are threaded through a hole in each slat are hard to reassemble one at a time and are more adapted to commercial large scale assembly rather than single set reassembly. Accordingly, while the Assignee of this patent, 3 Day Blinds, is still in business, it appears to have never sold such blinds.

BRIEF SUMMARY OF THE INVENTION

The present invention relates to a method for printing a graphic image on a set of blinds consisting of slats and strings wherein the blinds can easily be disassembled and reassembled after printing. In one embodiment, the slats are semi-transparent or transparent which allows some light to shine through the slat when hung in a window.

Accordingly, one embodiment of the invention is a method for printing an image graphic on a set of blinds having slats and strings wherein each of the slats has front face, a back face, and a top and bottom edge comprising:

a) selecting a set of blinds wherein the slats are held in place on the strings during use solely by gravity;
b) aligning the slats horizontally on the fixed vacuum bed of an ink jet printer without the strings, in a top edge of one slat to bottom edge of another slat manner with the front face or back face of each slat aligned for printing thereon;
c) printing the image on the aligned front face or back face of the slats;
d) removing the slats from the printer; and
e) positioning the slats on the strings to assemble the set of slats such that the image can be viewed when the blinds are in a closed position.

DETAILED DESCRIPTION OF THE INVENTION

Figure 1:
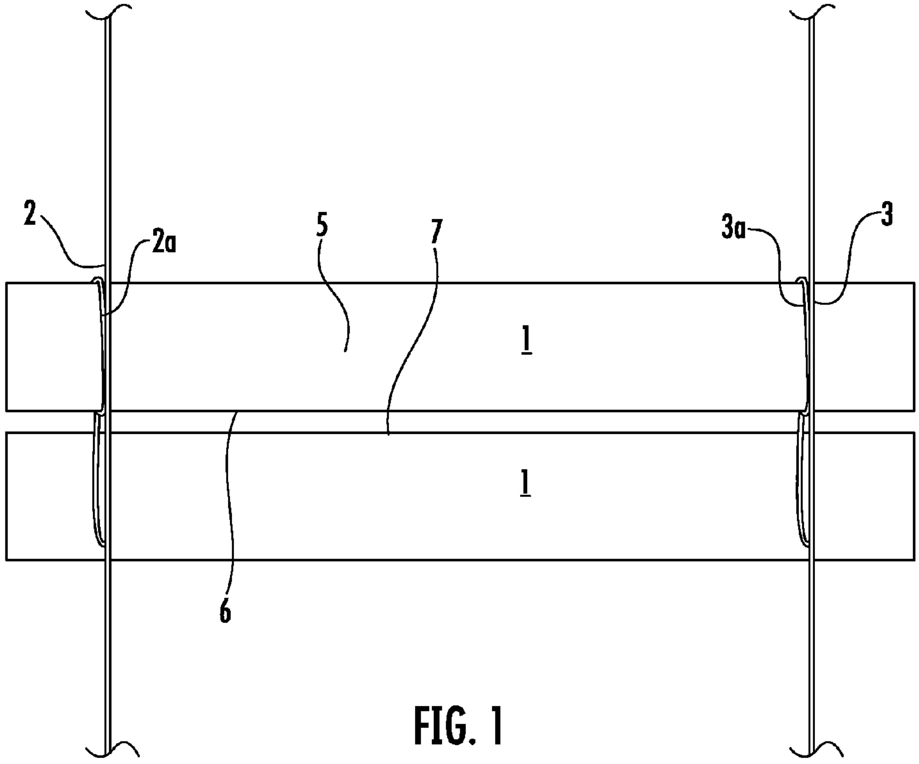
FIG. 1 is a frontal view of two slats of a set of blinds where the slats are held on the strings solely by gravity.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "set of blinds" refers to the type of blinds wherein there are horizontal slats with strings to operate the slats, wherein the slats are not inter connected, rather they are held in place by gravity while resting on the bottom of loops of strings on either side of the slats. The slats can be made of wood, metal, or plastic and in one embodiment the slats are opaque and in another embodiment they are semi-transparent or transparent such that light shining on the slats from the outside will cause the ink of the graphic to glow. In another embodiment the paint can be semi-transparent or transparent for use with the semi-transparent or transparent slats. Such slats can be made of a plastic material and semi-transparent and transparent inks are well known in the art. Typically slats range in length from about 12 inches to about 84 inches but are limited by the capacity of the inkjet printer being used.

The slats are easily removable, flat and have a front face and a back face. Each slat has a top and bottom edge which when in the closed blind position, aligns in an edge to edge manner (i.e. top edge of one slat to bottom edge of the adjacent slat). The slats can either start out by themselves or in another embodiment an assembled set of blinds has the slats removed by sliding them out of the strings. As used herein the term "fixed vacuum bed of an inkjet printer" refers to those large format printers wherein there is a non-movable fixed bed which holds items in place by vacuum for printing thereon. Such printers are available to the trade. Each slat is placed on the bed in a top edge of one slat to bottom edge of another slat in a manner with the front face or back face of each slat aligned for printing thereon. That is, all the faces or all the backs are printed on. The actual material of the slats can be selected to match the inks being used since inks for plastic, wood, or other materials are all known. One skilled in the art will be able to mate slat material with the proper selection of inks in view of the present disclosure.

Once the slats are placed on the fixed printer bed the inkjet printer prints the image on the slats. In one embodiment there is an image printed on both sides of the slat such that rotating the slats 180 degrees with the string provides a different image. It should be noted that the images must be aligned one right side up and on the other side upside down to match the positioning of the front and back face during normal blind slat 180 degree rotation.

Once the slats are printed on, they are removed from the printer and the slats easily replaced in the loops of the string and held in place by gravity to accomplish a reassembly of the blinds without worry about interconnecting the slats which as noted above is time consuming and difficult on a blind by blind basis. The image can then be viewed when the blinds are in the closed position.

Now referring to the drawings, FIG. 1 shows two slats of a set of blinds being held in place by gravity as the slat sits on the loops. Slat 1 is positioned horizontally with first side 2 being held by loop 2*a* and slat side 3 being held by gravity in loop 3*a*. Pull strings not shown but in the skill in the art, allow the slats to rotate about 180 degrees rotating from a front face 5 to a back face (side opposite 5) and hidden from view. Each slat has a top edge 6 and a bottom edge 7 with slats arranged in a top edge 6 next to bottom edge 7.

Figure 2:
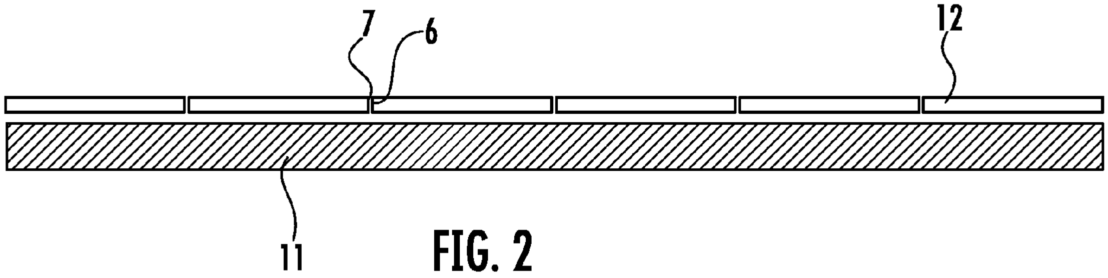
FIG. 2 shows a side view of slats aligned on a fixed bed inkjet printer in an edge to edge fashion.
Figure 3:
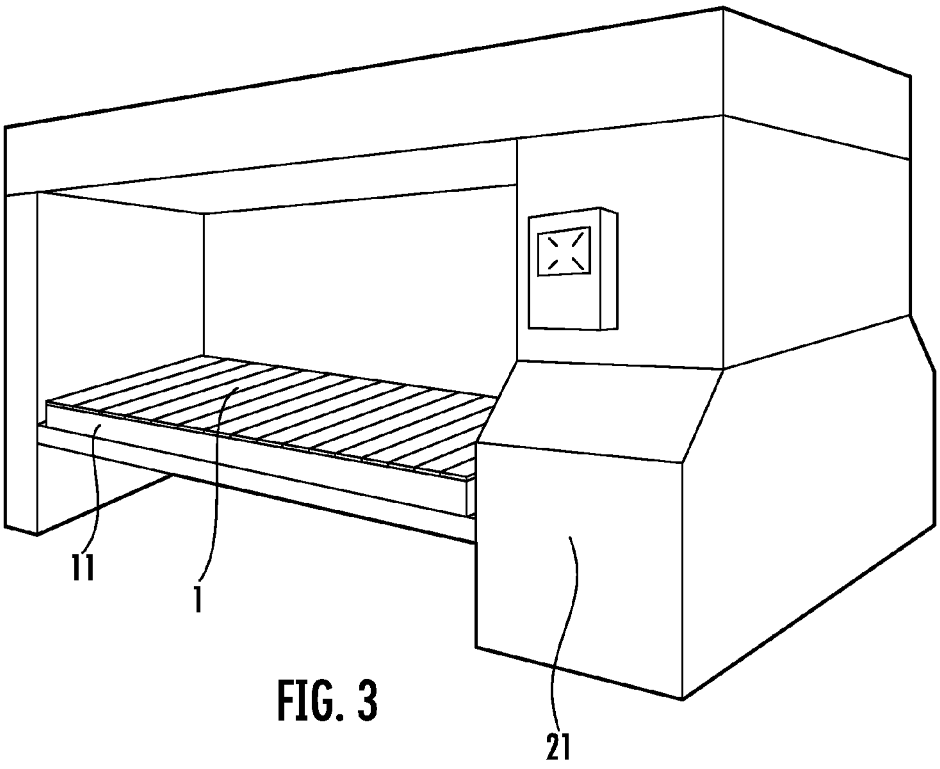
FIG. 3 shows the slats on a fixed bed in an inkjet printer.

FIG. 2 is a side view of slats edge to edge on a fixed vacuum bed of an inkjet printer. Vacuum Bed 11 has slats 1 positioned end 6 to end 7 are shown on the slat edge 12. In FIG. 3 there is a perspective view of a complete set of slats 1 from a set of blinds on the bed 11 of inkjet printer 21. The slats are printed and removed individually for reassembly into a set of blinds on the blind strings.

Figure 4:
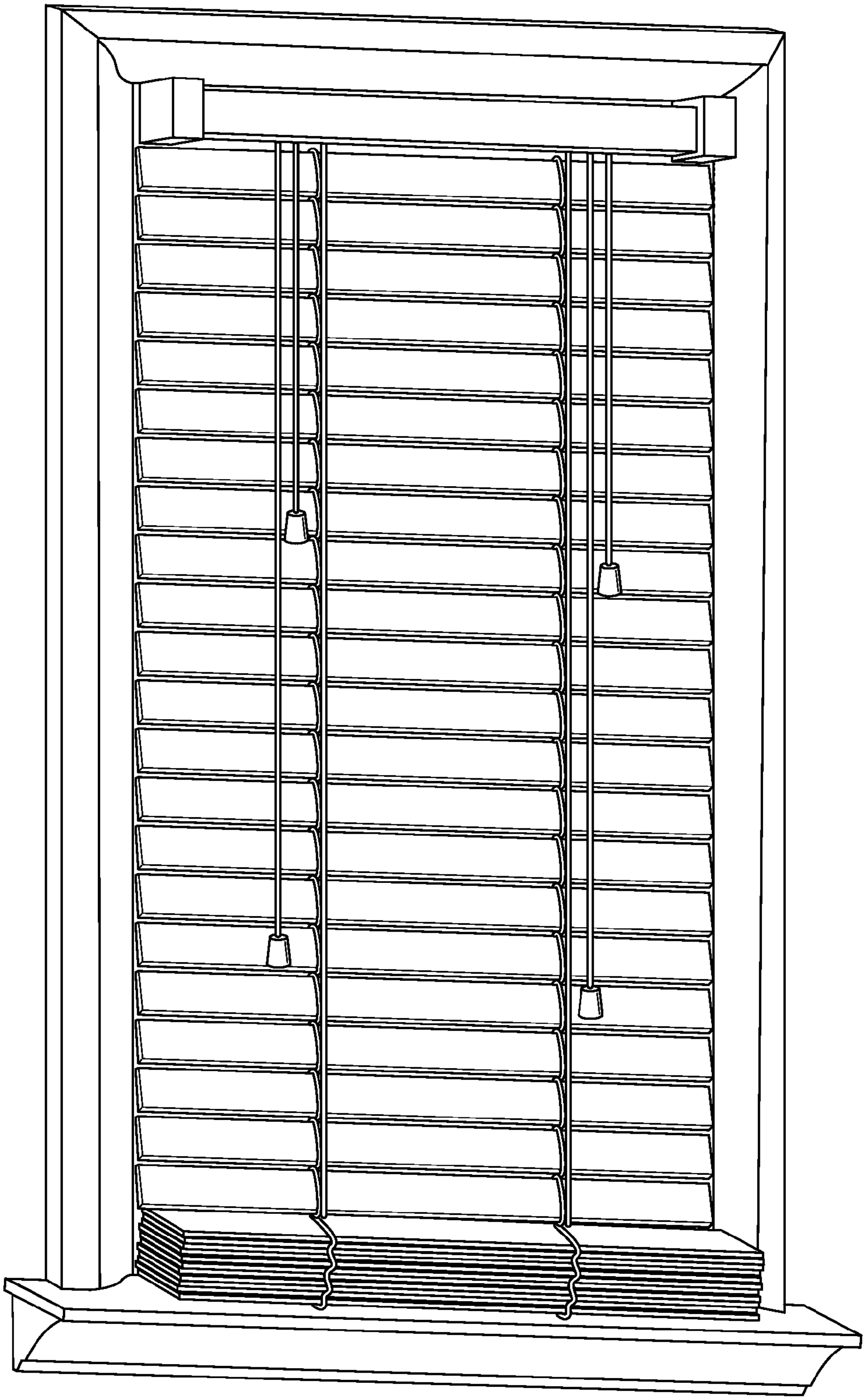
FIG. 4 shows a set of blinds prior to printing.
Figure 5:
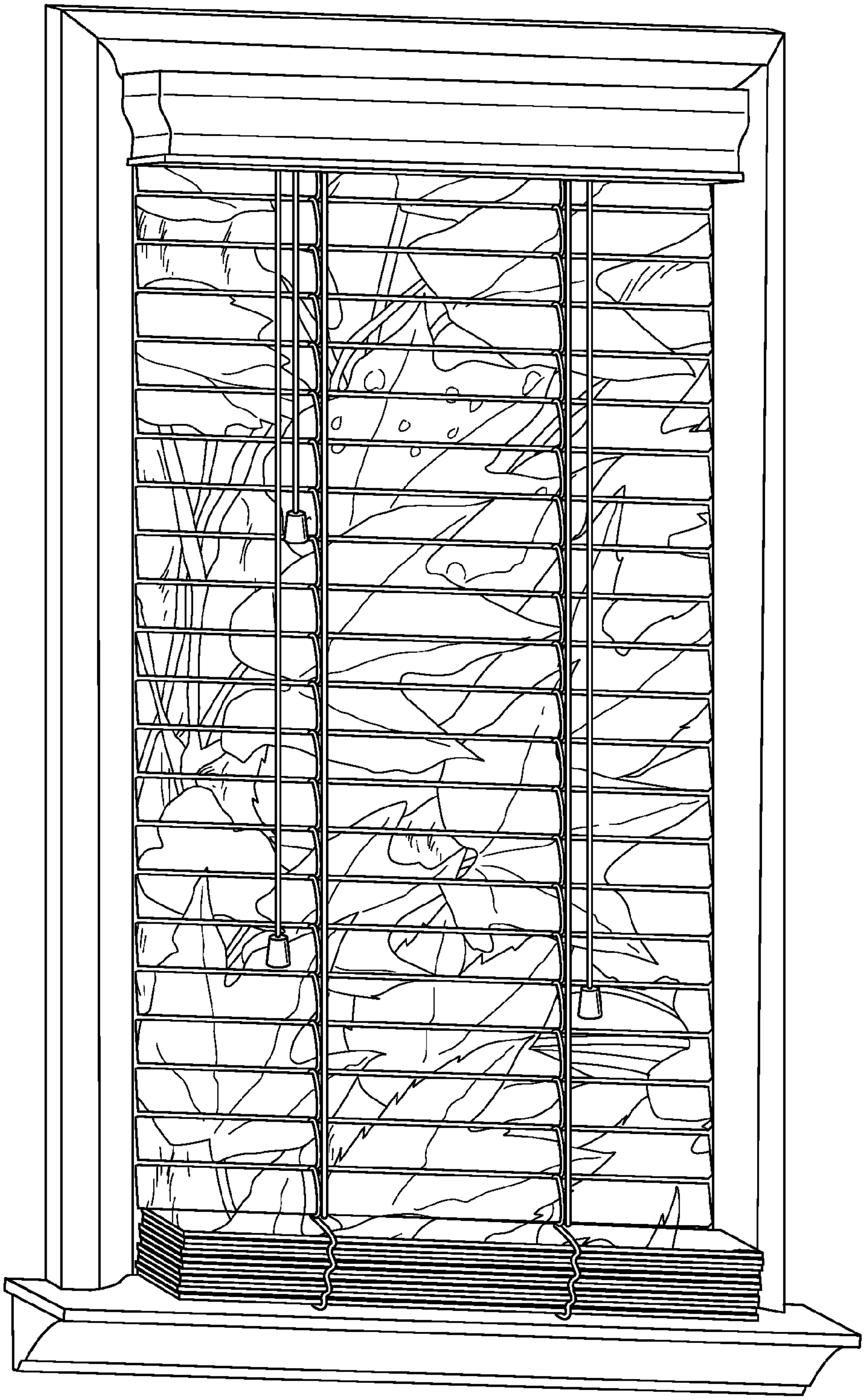
FIG. 5 shows a graphic image printed on semi transparent slats with semi-transparent ink such that the image glows from the sun shining through the slats.

FIG. 4 shows a perspective of a setoff blinds with the slats not interconnected 41. FIG. 5 shows a perspective view of a set of blinds with a graphic image printed on it 51 with the specific type of blinds used in the present invention. As noted above the present invention allows quick disassembly and assembly of the set of blinds for custom printing. If the blinds were the popular interconnected type there would be no commercial value to the invention since the time to assemble the blinds would be too great.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A method for printing an image graphic on a set of blinds having flat slats and strings wherein each of the slats has a front face, a back face and a top and bottom edge comprising:

a) selecting a set of blinds wherein the slats are not connected to one another and are held in place on the strings during use solely by gravity;

b) aligning the slats horizontally directly on a fixed vacuum bed of an ink jet printer without the strings, in a top edge of one slat to bottom edge of another slat manner with the front face or back face of each slat aligned for printing thereon and holding them flat and edge to edge in place with vacuum of the vacuum bed;

c) printing the image on the aligned front face or back face of the slats;

d) removing the slats from the printer; and e) positioning the slats on the strings to assemble the set of slats such that the image can be viewed when the blinds are in a closed position.

2. The method according to claim 1 wherein the slats are opaque.

3. The method according to claim 1 wherein the slats are semi-transparent or transparent prior to the printing step.

4. The method according to claim 3 wherein the ink used to print the image is semi-transparent or transparent.

5. The method according to claim 1 wherein there is an image printed on both the front face and back face of the slats.

6. The method according to claim 5 wherein both the image on the front faces and the image on the back faces can be viewed from a single selected viewing position by adjusting the position of the slats with the strings.

7. A set of blinds produced by the method of claim 1.

* * * * *